July 12, 1966  D. A. GARRETT  3,260,387
VEHICLE MOUNTED MATERIAL-HANDLING EQUIPMENT
Filed Dec. 21, 1964  3 Sheets-Sheet 1
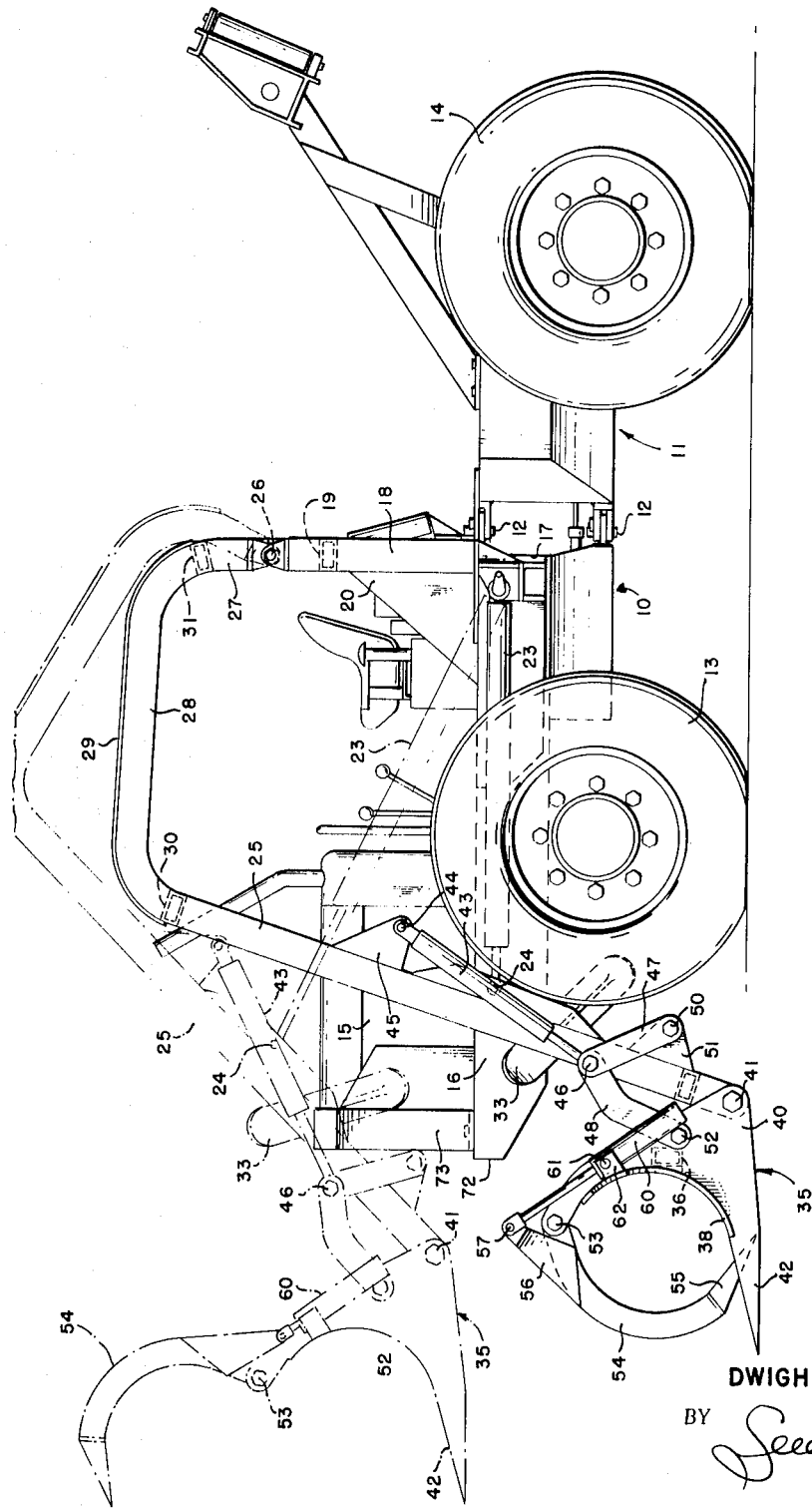
FIG—1
INVENTOR.
DWIGHT A. GARRETT
BY Seed & Berry
ATTORNEYS July 12, 1966  D. A. GARRETT  3,260,387
VEHICLE MOUNTED MATERIAL-HANDLING EQUIPMENT
Filed Dec. 21, 1964  3 Sheets-Sheet 2
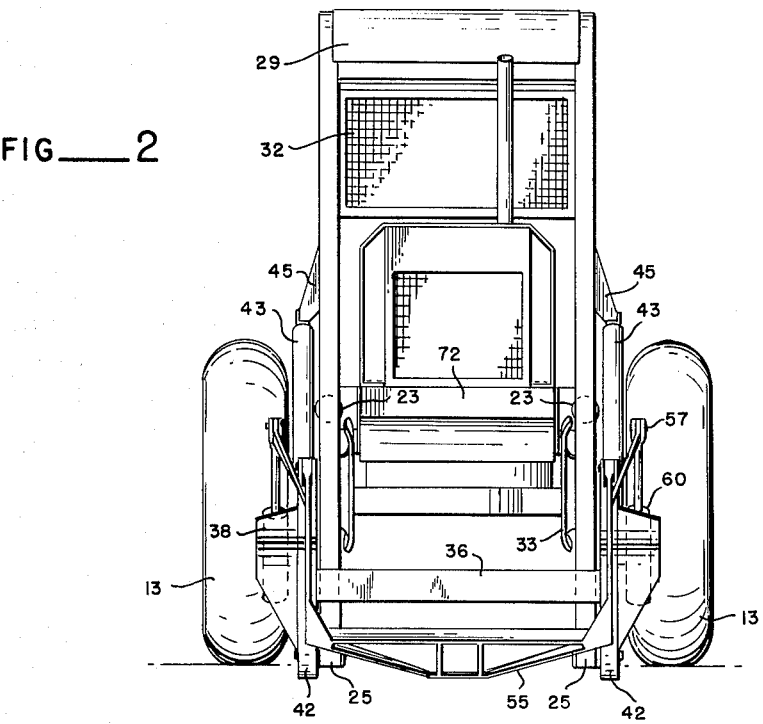
FIG__2
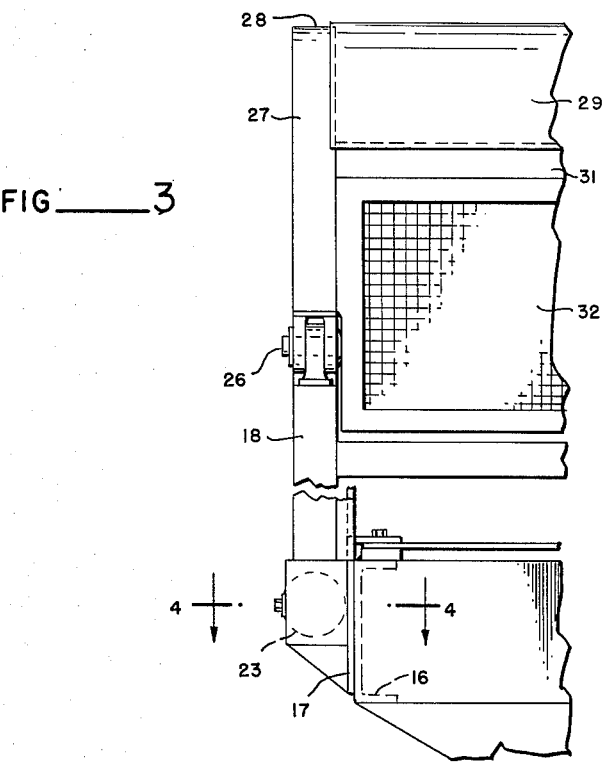
FIG__3
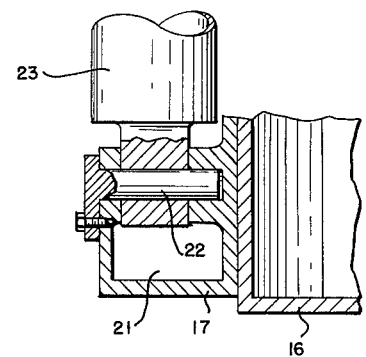
FIG__4
DWIGHT A. GARRETT
*INVENTOR.*
BY *Seed & Berry*
*ATTORNEYS*

July 12, 1966  D. A. GARRETT  3,260,387
VEHICLE MOUNTED MATERIAL-HANDLING EQUIPMENT
Filed Dec. 21, 1964  3 Sheets-Sheet 3
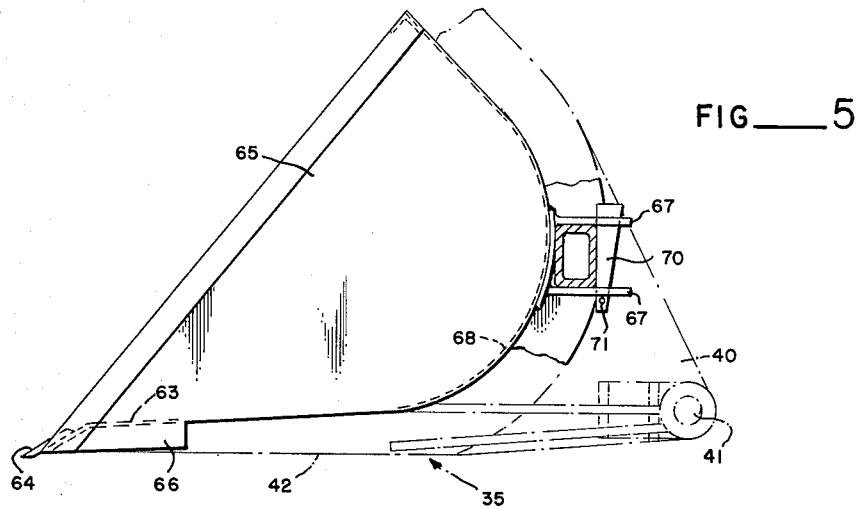
FIG — 5
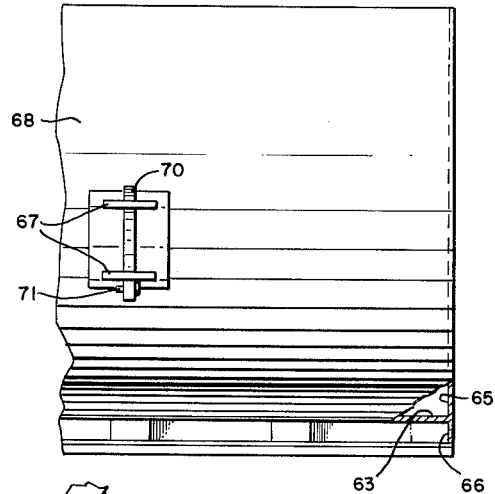
FIG — 6
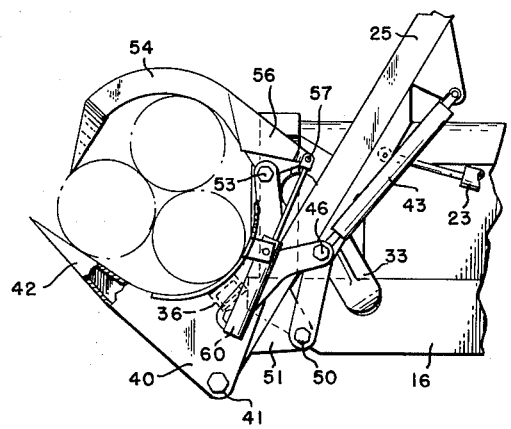
FIG — 7
DWIGHT A. GARRETT
INVENTOR.
BY *Seed & Berry*
ATTORNEYS

United States Patent Office 3,260,387
Patented July 12, 1966

3,260,387
VEHICLE MOUNTED MATERIAL-HANDLING EQUIPMENT
Dwight A. Garrett, Enumclaw, Wash., assignor to Garrett Enumclaw Co., a corporation of Washington
Filed Dec. 21, 1964, Ser. No. 419,932
5 Claims. (Cl. 214—147)

This invention relates to material-handling equipment, especially equipment for use in the yard of a pulp mill.

The general objects of the invention are to provide boom-carried equipment of comparatively simple and inexpensive construction which is adapted to be mounted upon a wheeled or crawler-type vehicle and which will perform its intended material-handling function with unusual efficiency.

It is a further and particular object to provide in conjunction with said material-handling equipment a protective canopy for the driver of the vehicle so mounted that the same swings in concert with the boom so that when the boom is swung upwardly into a position in which the canopy would normally obstruct the line of sight of the operator such canopy is caused to move to an out-of-the-way position.

A yet further object of the invention is to provide boom-carried material-handling equipment operated by sets of hydraulic jacks, with each set of jacks being double-acting and imparting swing movement to a related element of the equipment, and characterized in that the jacks have a comparatively short stroke and yet give to the concerned elements a wide range of swing.

As a further object still the invention aims to provide a vehicle having a boom thereon and wherein hydraulic jacks which operate the boom in its swing movement are so mounted as not to obstruct a driver either entering or leaving the driver's station.

Yet additional objects and advantages of the invention will appear and be understood in the course of the following description and claims, the invention consisting in the novel construction and in the adaptation and combination of parts hereinafter described and claimed.

In the accompanying drawings:

FIGURE 1 is a side elevational view portraying a material-handling vehicle constructed in accordance with the preferred embodiment of the present invention.

FIG. 2 is a front elevational view thereof.

FIG. 3 is a fragmentary rear elevational view of the front section of the vehicle and drawn to an enlarged scale.

FIG. 4 is a fragmentary large-scale horizontal sectional view on line 4—4 of FIG. 3.

FIG. 5 is a side elevational view of a bucket attachment for the material-handling head of the vehicle, indicated in operating position upon the head. The head is shown fragmentarily, partly in longitudinal vertical section and partly in phantom.

FIG. 6 is a fragmentary rear elevational view of the bucket; and

FIG. 7 is a fragmentary side elevational view showing the material-handling head in the position which it preferably occupies when the vehicle is in transit.

The tractor to which the present stacker is applied is desirably of the type illustrated and described in my issued U.S. Pat. No. 3,140,002, dated July 7, 1964. Front and rear 2-wheeled frame sections, designated generally by the numerals 10 and 11, respectively, articulate for relative swing motions about the vertical center of co-axial king pins 12. 13 and 14 designate the ground wheels for the two sections. 15 denotes a power plant for the vehicle. This power plant and a driver's station are supported by the front section, the power plant desirably lying to the immediate front and the driver's station lying to the immediate rear of a perpendicular raised from the axle of the section. An auxiliary take-off from the power plant drives a pump (not shown) for a hydraulic system which is responsible for the activation of a plurality of double-acting hydraulic ram-cylinder assemblies. One such hydraulic ram (not shown) extends horizontally from one to the other frame section in a position spaced laterally from the axis of the king pins and is responsible for steering the vehicle.

The front frame section provides a respective longitudinal principal 16 extending the substantial length of the section at each of the two sides, and affixed to the rear end of each such principal so as to overlie the top and outer face thereof is an angular bracket 17 serving as a base for a respective standard 18. The standards rise to a height which, preferably, approximates the head level of a driver occupying the drivers' station. A cross-member 19 joins such standards at their upper ends, and gussets 20 reinforce the standards against bending stresses directed endwise to the vehicle. To the outside of the frame principals and below the upper level thereof said brackets are each so formed as to provide a forwardly facing pocket 21. A respective one of two transverse horizontal co-axial pivot pins 22 traverses each pocket at its approximate mid-height. Each pin has the rear end of one of the above-mentioned ram-cylinder assemblies pivoted thereto. These ram assemblies, or jacks as they will be hereinafter termed, extend longitudinally of the vehicle frame and are denoted by 23.

The front end of each ram-cylinder assembly is pivotally attached, as at 24, to the outer leg 25 of a related one of two elbowed arms which are hinged, as at 26, to the upper ends of the standards. The inner legs of the elbowed arms have an inverted-L shape, with an inner section 27 which rises for a short distance from the pivot point and extends forwardly therefrom and has a length approximating that of the driver's station. The elbowed arms are perforce raised and lowered, swinging vertically about the center of the hinge pins 26 as an axis, by extension and contraction of the hydraulic jacks 23. In the lowered position the forwardly extending branches 27 of the inner legs of the elbowed arms lie substantially parallel to the ground. The outer legs 25, which serve as a boom and will be hereinafter so termed, extend downwardly and forwardly from the limb 28 and when the elbowed arms are in said lowered horizontal position locate their free ends at ground level a moderate distance to the rear of a perpendicular dropped from the front end of the vehicle main frame. Cross-bars 30 and 31 extend between the elbowed arms at approximately the front and rear end limits, respectively, of the overhead limb 28. A protective canopy 29 for the driver is joined along its side edges to the overhead branches 27 and along its end edges to said cross-bars. A protective screen 32 depends from said cross-bar 31 and has its side edges joined to vertical root-end sections of the elbowed arms. Each of the boom sticks 25 has a plate 33 welded to its inside face in a position whereat, by rub contact against the vehicle main frame, the boom sticks are held against lateral deflection while loads which are carried by a material-handling head are in transit.

The material-handling head is a fabricated structure comprised of a pair of matching cheek-bars 35 each of box-section construction and connected at a point more or less central to the length by a cross-piece 36.

When viewed in side elevation the head has somewhat of a C-shape to produce a maw or throat which is open to the front and to both sides. Webs 38 project laterally along a median span of the throat from each of the two box-section cheek-bars to increase the bearing surface. The cheek-bars have substantial depth in the area of the webbing and produce a heel section 40 to which the boom sticks are attached by means of co-axial pivot pins 41. Forwardly from said heel section, and considered in side elevation, each of the cheek-bars converges and forms one of two pointed fork arms 42. For a purpose which will hereinafter appear the outer face of each fork arm parallels the longitudinal median line of the head.

Two hydraulic jacks 43 act in concert to swing the head about the pivot pin 41. A respective one of these jacks is located immediately to the outside of each of the two boom sticks, extending more or less longitudinally thereof, and has its inner end pivoted at 44 to a bracket 45 fixed to and flaring outwardly from the underside of the related boom stick and its outer end pivoted at 46 to the articulating juncture between the two links 47 and 48 of a grasshopper-motion lever. The grasshopper lever has its purchase end pivoted at 50 to a bracket arm 51 carried at the outer end of the concerned boom stick and has its free end pivoted at 52 to the related cheek-bar of the material-handling head at a point thereon radially offset from the mounting pivot 41.

A lever of the first order is fulcrumed to the upper end of the material-handling head. The work arm of the lever has somewhat of a claw shape when viewed from the side and is comprised of a pair of laterally spaced apart legs 54 each fulcrumed by a pin 53 at a root end thereof to the upper end of a related one of the two cheek-bars, and at the free end joined one to the other by a cross-plate 55. The cross-plate desirably narrows to a point when viewed from the side, has a triangular plan configuration, and presents a flat underneath face backed by reinforcing ribs. The power arm for the described first-order lever comprises cranks 56 which are prolonged from the legs 54 beyond the fulcrum. Each crank has its outer end pivoted at 57 to one end of a related one of two hydraulic jacks 60 which are trunnion-mounted, as at 61, to forked brackets 62 each fixedly secured upon the back wall of a respective one of the cheek-bars.

The described claw-shaped work arm serves the usual function of a loading arm for drawing logs or other work either onto said fork arms 42 or into a bucket accessary hereinafter to be described, and as a keeper for the work load.

The bucket, which functions in much the same manner as the usual industrial scoop bucket, has a load chamber which is open to the front and closed along the back and both sides. Its rim profile, rear edge considered, corresponds to the C opening of the material-handling head and permits the bucket to fit snugly in said C opening, resting by its floor wall 63 upon the fork arms 42. The width of such floor wall moderately exceeds the over-all span of the fork arms. The bucket has a downwardly and forwardly inclined scooping lip 64 at the front, and for a moderate distance rearwardly from such lip has its side walls 65 prolonged downwardly below the floor wall to form flanges 66. The flanges act as guard walls flanking the fork arms to hold the bucket against lateral displacement relative to the fork arms. Vertically spaced paralleling lugs 67 project rearwardly from the crowned median portion of the bucket's back wall 68 at a point central to the width and produce a stall in which the cross-piece is received. The cross-piece is or may be rectangular in section, has a moderately close fit in the stall, and is locked therein by means of a tapering keeper pin 70 fitted with a cotter key 71.

When the vehicle is moving between loading and unloading sites the boom and head will normally be placed so as to occupy the positions in which they are shown in FIG. 7. In this location the cross-piece 36 bears against a bumper 72. The bumper lies to the front of the radiator 73 and is bolted or otherwise so fixedly secured to the longitudinal principals of the vehicle main frame as to be an integral part of such frame. It will be seen that by reason of the grasshopper connection the jacks 43 need have only a short stroke and yet give to the material-handling head a desired wide arc of swing.

From the safety aspect two features of the invention should be particularly noted. One is the location of the boom-swinging jacks in a position leaving a clear escape-way for the driver at both sides of the driver's station. The other feature is the mounting of the canopy so that the same swings upwardly in unison with an upward swing of the boom, thus to insure for the driver an unobstructed view at all times of the material-handling head in that the canopy is positioned out of the line of vision.

It is thought that the invention and the manner of its operation will have been clearly understood from the foregoing detailed description of my now-preferred illustrated embodiment. Changes in the details of construction may be resorted to without departing from the spirit of the invention and it is accordingly my intention that no limitations be implied and that the hereto annexed claims be given the broadest interpretation to which the employed language fairly admits.

What I claim is:

1. In combination with the frame of a tractor vehicle, a boom pivoted thereto for vertical swing movement about a transverse horizontal axis which lies to the rear of a driver's station at the approximate head level of a driver occupying the station, a material-handling head pivotally supported from the outer end of the boom for vertical swing movement about a transverse horizontal axis, a grasshopper linkage pivotally attached by its two ends one end to the boom and the other end to the head at points thereon proximal to but offset from the pivotal axis of the head, and independent double-acting hydraulic jacks for operating said boom and for operating the head one jack extending between the vehicle and the boom and the other jack extending between the boom and the elbow joint which connects the two links of the grasshopper linkage, the boom comprising companion matching arms one lying at one side and the other at the other side of the vehicle, said arms, when the boom occupies a lowered position, extending forwardly from the pivot axis in a generally horizontal plane elevated above the driver's station and thence reaching downwardly on a steep inclination to contact the ground at a point closely adjacent to a perpendicular dropped from the forward extremity of the frame, said boom having its two side arms joined by cross-members located at each of the two ends of said horizontal portion of the boom arms and having a canopy extending between said cross-members in spanning relation to the side arms.

2. Structure as claimed in claim 1 in which there are a set of two companion hydraulic jacks for swinging the boom, the two jacks of said set each being located to the outside of the vehicle frame and extending longitudinally of the vehicle with the outer end attached to the related arm at the approximate mid-length of the latter's inclined reach portion and the inner end attached to the vehicle at a point thereon which is below the floor level of the driver's station in a transverse vertical plane approximately coinciding with that in which the swing axis of the boom lies, said companion hydraulic jacks, when the boom occupies said lowered position, lying below the floor level of the driver's station so as not to in any way obstruct the passage-way used by the driver when entering and leaving the driver's station.

3. In combination with the frame of a tractor vehicle, a boom pivoted thereto for vertical swing movement about a transverse horizontal axis which lies to the rear of a driver's station at the approximate head level of a driver occupying the station, a material-handling head pivotally supported from the outer end of the boom for vertical swing movement about a transverse horizontal axis, and independent means each including a respective double-acting hydraulic jack for operating said boom and for operating the head one said means extending between the vehicle frame and the boom and the other said means extending between the boom and the head, the boom comprising companion matching arms one lying at one side and the other at the other side of the vehicle, said arms, when the boom occupies a lowered position, extending forwardly from the pivot axis in a generally horizontal plane elevated above the driver's station and thence reaching downwardly on a steep inclination to contact the ground at a point closely adjacent to a perpendicular dropped from the forward extremity of the frame, said boom having a canopy for the protection of the driver extending in spanning relation to the side arms of the boom for the approximate length of the horizontal portion of the boom.

4. In combination with the frame of a tractor vehicle, a forwardly extending boom supported from the frame for vertical swing movement about a transverse horizontal axis, a material-handling head supported from the forward end of the boom, said head comprising companion spaced-apart cheek-bars formed to a general C-shape when viewed from the side with the bottom portions thereof serving as fork arms to carry a load and to the rear of said forks having a cross-member extending as a rigid connection between the cheek-bars, and a bucket attachment shaped so as to snugly occupy the C opening of the head, the bucket being provided along each of its two sides with a respective pocket arranged to receive a related one of the two fork arms and also having spaced lugs extending rearwardly from the rear wall forming a stall to register with and receive the cross-member when the fork arms are lodged in said pockets, and a removable keeper pin for holding the cross-member in the stall.

5. Structure as claimed in claim 2, the frame including a pair of longitudinal principals each extending along a respective side of the vehicle, having a respective bracket for the pivot mounting of the inner end of a respective one of the two boom-swinging jacks formed to an angular shape so as to overlie the top and the outer face of a related said frame principal, and having a standard footing upon each bracket and serving as a pivot mounting for the inner end of a respective one of the two boom arms.

References Cited by the Examiner

UNITED STATES PATENTS

| | | |
|---|---|---|
| 2,349,352 | 5/1944 | Johnson. |
| 2,597,374 | 5/1952 | Rickey _____ 214—145 |
| 2,670,862 | 3/1954 | Siebring _____ 214—145 |
| 2,731,162 | 1/1956 | Walstrom _____ 214—140 |
| 2,774,496 | 12/1956 | Dorkins _____ 214—140 |
| 3,094,231 | 6/1963 | Dempster et al. _____ 214—302 |
| 3,155,253 | 11/1964 | Pilch _____ 214—140 |

HUGO O. SCHULZ, *Primary Examiner.*